Jan. 16, 1968     G. KASPARIAN     3,363,920
PEDESTAL SUPPORT
Filed Jan. 6, 1965
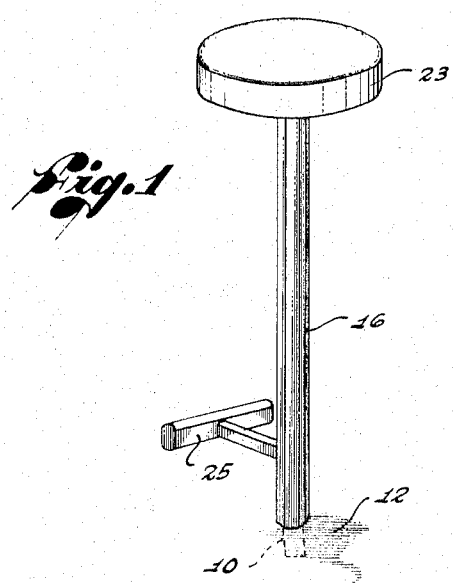
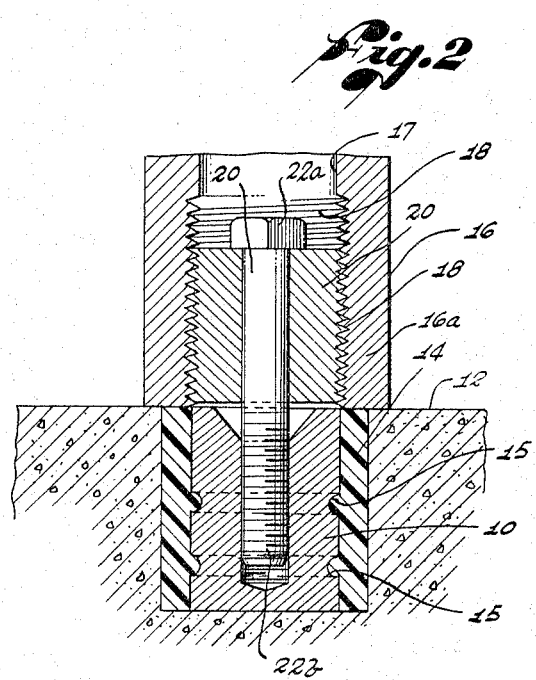
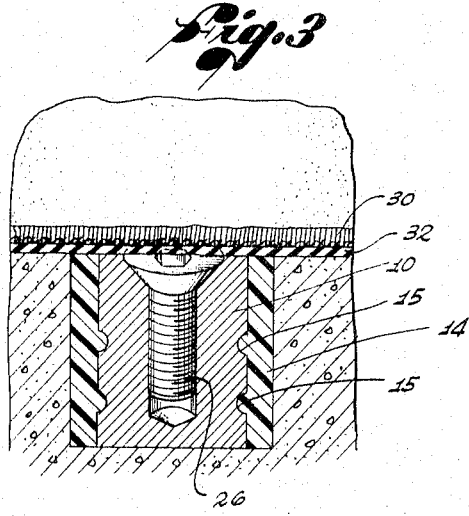
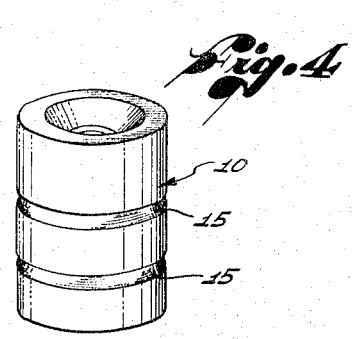
INVENTOR.
GEORGE KASPARIAN
BY Fulwider, Patton, Rieber, Lee and Utecht
ATTORNEYS > # United States Patent Office > 3,363,920
> Patented Jan. 16, 1968

3,363,920
PEDESTAL SUPPORT
George Kasparian, Los Angeles, Calif., assignor to Kasparian's, Inc., Los Angeles, Calif., a corporation of California
Filed Jan. 6, 1965, Ser. No. 423,791
2 Claims. (Cl. 287—20.2)

ABSTRACT OF THE DISCLOSURE

A hollow support member threaded internally at one end to receive an externally threaded hollow plug which is anchored to a structure by preferably extending a bolt through the plug and into a nut affixed below the level of the structure.

---

This invention relates generally to pedestal supports for chairs, stools, tables and the like, and more specifically relates to means for providing a pedestal support which may be fixedly mountd to a floor and which permits ready dismounting of the pedestal support therefrom.

In the past, many constructions have been utilized for fixedly mounting a pedestal support to a floor while permitting its ready dismounting. However, the constructions of which I am aware require specially made members rather than standard items, and are thus costly to manufacture. It is therefore a major object of my invention to provide a readily dismountable, but readily fixedly mountable pedestal support in an inexpensive manner utilizing standard members and parts for the construction of the pedestal support. Other pedestal supports of which I am aware are ungainly and large at their juncture with the floor rather than neat and compact and it is therefore another object of this invention to provide a pedestal support that fastens to the floor in as compact a manner as possible.

These and other objects of the present invention will become clearly understood with reference to the description which follows, and to the accompanying drawings wherein:

FIGURE 1 is a perspective view of the pedestal support of my invention shown mounted to a floor, and supporting a stool and foot rest;

FIGURE 2 is a fragmentary cross-section taken along the vertical axis of the pedestal support shown in FIGURE 1;

FIGURE 3 is a fragmentary cross-section taken in perspective, along the vertical axis of the pedestal support shown in FIGURE 1 showing the pedestal support dismounted and replaced by other means; and FIGURE 4 is a perspective view of a nut employed in conjunction with the pedestal support of my invention.

In general, my invention comprises an internally threaded member or nut fixedly mounted in place beneath floor level; the pedestal support is a standard tubular or hollow member and has the inner surface of its lower end threaded to receive an externally threaded hollow cylindrical plug. The hollow pedestal is fixedly mounted to the threaded nut by means of a bolt passing through the plug, the bolt being threadably received by the threaded nut. Such mounting provides for ready removal while enabling a fixed mounting to be achieved in a simple and compact manner.

More specifically, an internally threaded nut 10 is first fixed in place beneath the floor level by means of an epoxy resin adhesive or the like 14. The threaded nut 10 may have peripheral grooves 15 which assures the locking of the nut beneath the floor by preventing vertical movement thereof once the epoxy resin has cured.

The tubular or support member or pedestal 16, to be mounted to the floor, is hollow, its inner surface 17 being substantially circular in cross-section over the entire length of the support member. The external surface of pedestal 16 may be arcuate or it may be angular, as shown in FIGURE 1. The pedestal 16 is internally threaded at the lower end 16a thereof, the internal threads being designated by the numeral 18. The pedestal 16 is generally made of a metal, such as machined or extruded aluminum or steel.

In order to fixedly mount the pedestal 16 to the floor, an externally threaded hollow cylindrical plug 20 is first threadably received by the lower threaded end 16a of the pedestal 16 and a long hex-headed bolt 22 is dropped through the upped end of the hollow pedestal through the interior thereof, and is passed through the interior of the hollow plug 20 until the head 22a of the bolt rests on the top of the plug. The lower end 22b of the bolt 22 is threaded onto the imbedded nut 10 by means of a longhandled wrench (e.g. a wrench having an Allen-type wrench head mounted onto a long handle) which is passed through the hollow interior of the pedestal 16 until it receives the head of the bolt 22. The bolt 22 is then tightened in the usual manner to fixedly mount the pedestal 16 to the floor, the pedestal 16 carries a stool 23 and a foot rest 25, the method of attachment of these being conventional.

It will be noted that this means for mounting a pedestal support is extremely compact and neat since no threaded means are visible once the pedestal is fixed in place. No outward flaring of the pedestal support is required as the entire means for attachment is internal. All parts employed are of standard shape and are usually made of metal and sometimes of a tough plastic.

If the pedestal 16 is to be removed, for cleaning purposes, to provide an open space for any one of a variety of reasons, or to be permanently taken away, the elongated threaded bolt 22 is removed, and the pedestal 16 also removed. The opening in imbedded nut 10 threadably receives a flat-head screw 26 which screw fills the nut opening (see FIGURE 3). In this manner, the floor need not have any gaps therein upon removal or dismounting of the pedestal 16 therefrom. Carpet 30 and underpadding 32 may then cover the screw 26 if desired. If, at any time, the pedestal 16 is to be replaced, the screw 26 need only be removed, and the pedestal mounted, as described herein.

While one preferred embodiment has been described and illustrated herein, it will be appreciated that other modifications will become apparent to those skilled in the art that lie within the scope of the invention. Hence, I intend to be bound only by the claims which follow.

I claim:

1. A pedestal support adapted to be mounted to a floor, which comprises:

an elongated hollow cylindrical support member having a normally upper end and a normally lower end, said normally upper end being adapted to support an object and said lower end having the inner surface thereof threaded;

an externally threaded hollow cylindrical plug member threadedly mounted in said threaded lower end of said elongated hollow cylindrical support member, said plug member having a substantially uniform circular cross-section along its entire length; and bolt means passing through said hollow cylindrical plug member and received by an internally threaded nut means affixed below the level of said floor, said internally threaded nut means having a threaded bore terminating in a counterbore at one end which end is substantially flush with the surface of said floor and also having means on its outer periphery for receiving an adhesive in interlocking relationship thereto to prevent withdrawal of the threaded nut.

2. The pedestal support of claim 1 wherein said elongated hollow support member has a substantially circular cross-section along its entire length.

References Cited

UNITED STATES PATENTS

| | | | |
|---|---|---|---|
| 569,995 | 10/1896 | Boyd | 287—124 X |
| 692,841 | 2/1902 | Fenton | 52—296 X |
| 1,380,041 | 5/1921 | Cook. | |
| 2,469,494 | 5/1949 | Bushko | 52—298 X |
| 2,733,785 | 2/1956 | Beatty | 52—298 X |
| 2,880,830 | 4/1959 | Rohe | 52—704 X |
| 3,256,659 | 6/1966 | Dudoff | 52—298 |

CARL W. TOMLIN, *Primary Examiner.*

EDWARD C. ALLEN, *Examiner.*

A. V. KUNDRAT, *Assistant Examiner.*